US012804126B2

(12) United States Patent
Ito

(10) Patent No.: US 12,804,126 B2

(45) Date of Patent: Nov. 17, 2026

(54) STEREOSCOPIC DISPLAY DEVICE

(71) Applicant: JVCKENWOOD Corporation, Kanagawa (JP)

(72) Inventor: Fumihiko Ito, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 19/335,960

(22) Filed: Sep. 22, 2025

(65) Prior Publication Data

US 2026/0019557 A1 Jan. 15, 2026

Related U.S. Application Data

(63) Continuation of application No. PCT/JP2024/011373, filed on Mar. 22, 2024.

(30) Foreign Application Priority Data

Mar. 24, 2023 (JP) ................................ 2023-048664
Mar. 24, 2023 (JP) ................................ 2023-048665

(51) Int. Cl.
*H04N 13/398* (2018.01)
*G02B 26/00* (2006.01)
(Continued)

(52) U.S. Cl.
CPC ......... *H04N 13/398* (2018.05); *G02B 26/008* (2013.01); *G02B 26/10* (2013.01);
(Continued)

(58) Field of Classification Search
None
See application file for complete search history.

(56) References Cited

U.S. PATENT DOCUMENTS 5,914,807 A * 6/1999 Downing ............ H04N 13/324 348/E13.055
6,281,994 B1 * 8/2001 Horikoshi ........... G03H 1/2205 359/22

(Continued)

FOREIGN PATENT DOCUMENTS

JP H08129147 A * 5/1996
JP 2007206588 A 8/2007

(Continued)

*Primary Examiner* — Mohammed Jebari

(74) *Attorney, Agent, or Firm* — PROCOPIO, CORY, HARGREAVES & SAVITCH LLP

(57) ABSTRACT

A stereoscopic display device includes a light source unit including a laser light source, a converter configured to convert a laser beam to a collimated beam with a predetermined diameter, and a splitter configured to emit a plurality of collimated beams by reflecting the collimated beam incident from the converter using a plurality of mirrors having different reflection directions, an irradiation unit including a converger configured to cause the plurality of collimated beams incident from the light source unit to converge to generate a plurality of converged beams and to cause the plurality of converged beams to interfere with each other at a light condensing position and a scanner configured to three-dimensionally scan the light condensing position by changing a focal distance at which the converged beams are caused to converge by the converger and changing optical axis directions.

6 Claims, 14 Drawing Sheets

(51) Int. Cl.

| | |
|---|---|
| ***G02B 26/10*** | (2006.01) |
| ***G02B 30/50*** | (2020.01) |
| ***H04N 13/32*** | (2018.01) |
| ***H04N 13/388*** | (2018.01) |

(52) U.S. Cl.

CPC ........... *G02B 26/101* (2013.01); *G02B 30/50* (2020.01); *H04N 13/32* (2018.05); *H04N 13/388* (2018.05)

(56) References Cited

U.S. PATENT DOCUMENTS

| | | | | |
|---|---|---|---|---|
| 8,928,721 | B2 * | 1/2015 | Sakurai | B41J 2/471 347/261 |
| 2011/0317130 | A1 * | 12/2011 | Gollier | H04N 9/3129 353/34 |
| 2013/0341508 | A1 * | 12/2013 | Betsui | H04N 13/39 250/329 |
| 2014/0015867 | A1 * | 1/2014 | Xin | H04N 13/39 359/462 |
| 2018/0131927 | A1 * | 5/2018 | Vora | H04N 13/39 |
| 2019/0141315 | A1 * | 5/2019 | Broadbent | H04N 13/39 |
| 2021/0285883 | A1 * | 9/2021 | Vasdekis | G02B 21/26 |

FOREIGN PATENT DOCUMENTS

| | | | | | |
|---|---|---|---|---|---|
| JP | 4747243 | B2 | * | 8/2011 | G02B 21/002 |
| JP | 2012220606 | A | * | 11/2012 | |
| JP | 2016033665 | A | * | 3/2016 | |
| JP | 2019117684 | A | * | 7/2019 | |

* cited by examiner

L31+L32

L31+L32+L33+L34

STEREOSCOPIC DISPLAY DEVICE

TECHNICAL FIELD

The present invention relates to a stereoscopic display device.

Priority is claimed on Japanese Patent Application No. 2023-048664 and Japanese Patent Application No. 2023-048665, filed Mar. 24, 2023, the content of which is incorporated herein by reference.

BACKGROUND ART

In the related art, various methods for a stereoscopic display device that displays a video in the air have been proposed. As an example of the stereoscopic display device according to the related art, a technique of forming voxels (spatial pixels) by condensing a laser beam to generate plasma and displaying a video in the air has been disclosed (for example, see Patent Document 1).

CITATION LIST

Patent Document

Patent Document 1: Japanese Unexamined Patent Application, First Publication No. 2007-206588

SUMMARY OF INVENTION

In the aforementioned stereoscopic display device, a stereoscopic image with sufficient brightness can be drawn by causing a laser beam to be incident as an excitation beam on a fluorescent material to generate bright spots. On the other hand, it may be difficult to draw a bright spot at a desired position according to a correlation between characteristics of a fluorescent material and an intensity of a laser beam which is an excitation beam. In this case, there is a problem in that image quality of a stereoscopic image will deteriorate.

The present invention was made in consideration of the aforementioned circumstances, and an objective thereof is to provide a stereoscopic display device that can improve image quality of a stereoscopic image.

[1] According to an aspect of the present invention, there is provided a stereoscopic display device including: a light source unit including a laser light source configured to emit a laser beam, a converter configured to convert a laser beam emitted from the laser light source to a collimated beam with a predetermined diameter, and a splitter configured to emit a plurality of collimated beams by reflecting the collimated beam which is incident from the converter using a plurality of mirrors having different reflection directions; an irradiation unit including a converger configured to cause the plurality of collimated beams incident from the light source unit to converge to generate a plurality of converged beams and to cause the plurality of converged beams to interfere with each other at a light condensing position and a scanner configured to three-dimensionally scan the light condensing position by using a drawing space including a fluorescent material which is excited to spontaneously emit light with irradiation with a laser beam as a scan target range, changing a focal distance at which the converged beams are caused to converge by the converger, and changing optical axis directions in which the plurality of converged beams are emitted together using a single optical axis direction changing element; and an intensity control unit configured to control an intensity at the light condensing position on the basis of drawing data indicating a light emission intensity at each position in the drawing space.

[2] In the stereoscopic display device according to the aspect of [1] of the present invention, the light source unit further includes a phase controller configured to control a phase of at least one of the plurality of collimated beams, and the at least one collimated beam of which the phase has been controlled by the phase controller is emitted to the converger.

[3] According to another aspect of the present invention, there is provided a stereoscopic display device including: a light source unit including a plurality of laser light sources configured to each emit a laser beam and a converter configured to convert a laser beam emitted from each laser light source to a collimated beam with a predetermined diameter, the light source unit emitting a plurality of collimated beams on which conversion has been performed by the converter; an irradiation unit including a converger configured to cause the plurality of collimated beams incident from the light source unit to converge to generate a plurality of converged beams and to cause the plurality of converged beams to interfere with each other at a light condensing position and a scanner configured to three-dimensionally scan the light condensing position by using a drawing space including a fluorescent material which is excited to spontaneously emit light with irradiation with a laser beam as a scan target range, changing a focal distance at which the converged beams are caused to converge by the converger, and changing optical axis directions in which the plurality of converged beams are emitted together using a single optical axis direction changing element; and an intensity control unit configured to control an intensity at the light condensing position on the basis of drawing data indicating a light emission intensity at each position in the drawing space.

[4] According to another aspect of the present invention, there is provided a stereoscopic display device including: a light source unit including a plurality of sets of a laser light source and a converter, the laser light source emitting a laser beam, the converter converting a laser beam emitted from the laser light source to a collimated beam with a predetermined diameter, the light source unit emitting a plurality of collimated beams; an irradiation unit including a modulator configured to modulate a phase of at least one out of the plurality of collimated beams emitted from the light source unit, a converger configured to cause the plurality of collimated beams incident from the modulator to converge to generate a plurality of converged beams and to cause the plurality of converged beams to interfere with each other at a light condensing position, and a scanner configured to three-dimensionally scan the light condensing position by using a drawing space including a fluorescent material which is excited to spontaneously emit light with irradiation with a laser beam as a scan target range, changing a focal distance at which the converged beams are caused to converge by the converger, and changing optical axis directions in which the plurality of converged beams are emitted together using a single optical axis direction changing element; an intensity control unit configured to control an intensity at the light condensing position on the basis of drawing data indicating a light emission intensity at each position in the drawing space; and a phase control unit configured to control phase modulation of a collimated beam performed by the modulator.

[5] In the stereoscopic display device according to the aspect of [4] of the present invention, the phase control unit sets the plurality of converged beams to have the same phase at the light condensing position.

[6] In the stereoscopic display device according to the aspect of [4] or [5] of the present invention, the plurality of laser light sources included in the light source unit are different in wavelength of a laser beam to be emitted.

According to the present invention, it is possible to improve image quality of a stereoscopic image.

DESCRIPTION OF EMBODIMENTS

Figure 1:
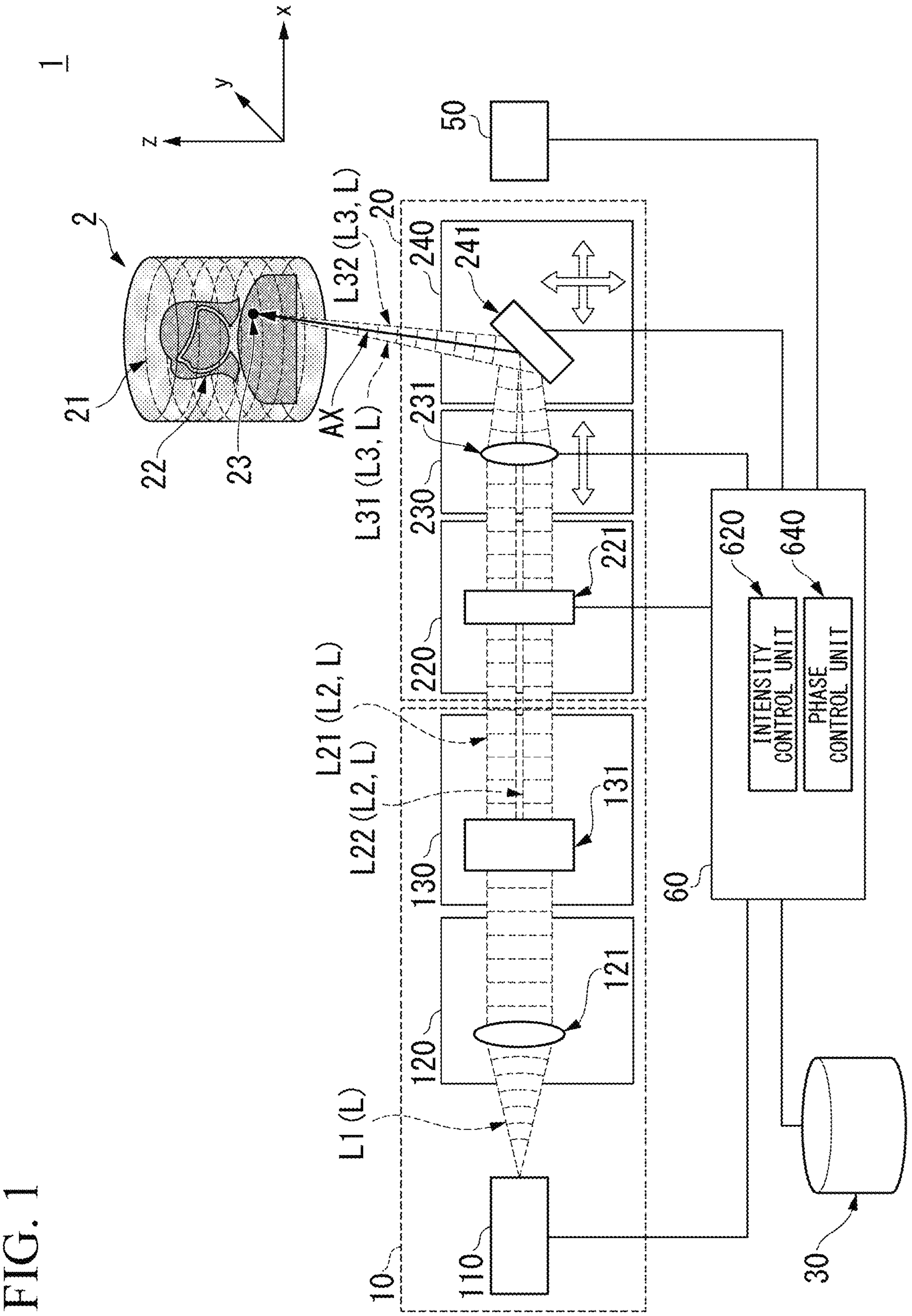
FIG. 1 A diagram illustrating an example of a configuration of a stereoscopic display device according to an embodiment.

Exemplary embodiments of a stereoscopic display device according to an aspect of the present invention will be mentioned and described in detail below with reference to the accompanying drawings. The following embodiments are only examples, and an embodiment to which the present invention is applied is not limited to the embodiments. "On the basis of XX" mentioned in this specification means "on the basis of at least XX" and includes "on the basis of another element in addition to XX." "On the basis of XX" is not limited to direct use of XX and includes use of results obtained by performing calculation or processing on XX. "XX" is an arbitrary factor (for example, arbitrary information). In the drawings used for the following description, scales, numbers, and the like of constituent members may be made to be different from actual scales, numbers, and the like of the constituent members in order to make the constituent members be easily recognized.

Hereinafter, embodiments will be described with reference to the drawings.

First Embodiment

[Functional Configuration of Stereoscopic Display Device 1]

FIG. 1 is a diagram illustrating an example of a configuration of a stereoscopic display device 1 according to an embodiment. The stereoscopic display device 1 is a device that displays a stereoscopic image in a drawing space 2 by scanning the drawing space 2 which is a scan target range including a fluorescent material 21 with a laser beam L.

The drawing space 2 is a space in which the fluorescent material 21 can be maintained. For example, the drawing space 2 is an internal space of a cylindrical container with a cylindrical transparent wall in which a powder fluorescent material 21 is enclosed. In this case, the drawing space 2 is a hollow region. For example, the drawing space 2 is an object formed of a transparent resin into which the fluorescent material 21 is kneaded. In this case, the drawing space 2 is a solid region.

That is, "space" of the drawing space 2 has only to be a region which spreads three-dimensionally regardless of whether it is solid or not. The drawing space 2 may be formed of one of gas, liquid, and solid at a predetermined volume concentration.

The fluorescent material 21 is a material having a photoluminescence effect and is a quantum dot (QD) dispersed material in an example of the present embodiment. The QD dispersed material is a material in which quantum dots are dispersed in an organic solvent (for example, toluene), a gas, or a solid in a predetermined volume concentrati.

For example, the fluorescent material 21 may be formed by dispersing (scattering) a fluorescent substance including rare-earth element in a transparent resin and solidifying the resultant material.

The stereoscopic display device 1 includes a light source unit 10, an irradiation unit 20, a storage unit 30, and a control unit 60.

The light source unit 10 includes a laser light source 110, a converter 120, and a splitter 130. The laser light source 110 emits a laser beam L. The laser light source 110 may be, for example, an ultraviolet laser or a small laser diode with a wavelength of 405 nm. In the following description, the laser beam L emitted from the laser light source 110 is also referred to as a source beam L1.

The source beam L1 emitted from the laser light source 110 is not a parallel beam and has characteristics in which the source beam spreads in a conical shape with the laser light source 110 as a vertex.

The source beam L1 immediately after it has been emitted from the laser light source 110 has a sufficiently small diameter. On the other hand, the source beam L1 at a position apart from the laser light source 110 has a larger diameter than that of the source beam L1 immediately after it has been emitted from the laser light source 110. Accordingly, the source beam L1 immediately after it has been emitted from the laser light source 110 has higher energy per unit area in the diameter direction. The source beam L1 at a position apart from the laser light source 110 has lower energy per unit area in the diameter direction (that is, a sectional area of a light flux).

The converter 120 includes a collimating lens 121. The collimating lens 121 converts the source beam L1 propagating in a conical shape to a parallel beam with a predetermined diameter. In the following description, the laser beam L converted to a parallel beam by the collimating lens 121 is also referred to as a collimated beam L2. That is, the converter 120 converts the emitted source beam L1 to a collimated beam L2 with a predetermined diameter.

The collimated beam L2 is a beam obtained by converting a source beam L1 with lower energy per unit area in the diameter direction to a parallel beam as described above. Accordingly, the collimated beam L2 has lower energy per unit area in the diameter direction.

The splitter 130 emits a plurality of collimated beams L2 by reflecting the collimated beam L2 which is input from the converter 120 using a plurality of split mirrors 132 (mirrors) having different reflection directions. A specific example of the configuration of the splitter 130 will be described below with reference to FIG. 2.

Figure 2:
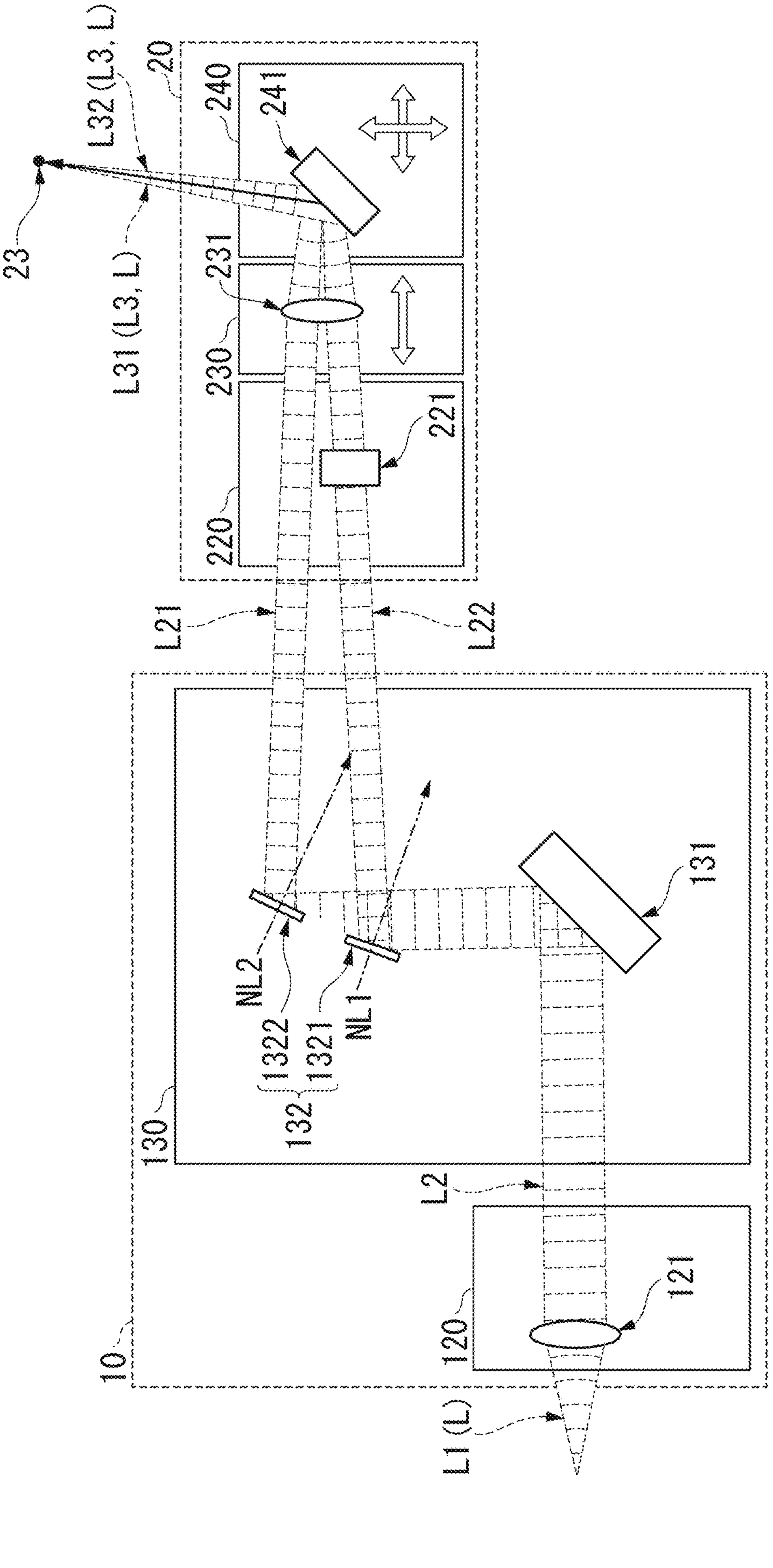
FIG. 2 A diagram illustrating an example of a configuration of a splitter according to the embodiment.

FIG. 2 is a diagram illustrating an example of a configuration of the splitter 130 according to the present embodiment. The splitter 130 includes a light guide mirror 131 and a split mirror 132.

The light guide mirror 131 guides the collimated beam L2 incident from the converter 120 to the split mirror 132. The splitter 130 has only to have a configuration that can guide the collimated beam L2 to the split mirror 132, and the light guide mirror 131 is not an essential constituent. For example, a configuration in which the collimated beam L2 exiting the converter 120 is directly incident on the split mirror 132 may be employed.

The split mirror 132 splits the incident collimated beam L2 into a plurality of collimated beams L2. For example, the split mirror 132 includes a first split mirror 1321 and a second split mirror 1322. The collimated beam L2 incident on the split mirror 132 is split into a first collimated beam L21 reflected by the first split mirror 1321 and a second collimated beam L22 reflected by the second split mirror 1322.

A normal line NL1 of the first split mirror 1321 and a normal line NL2 of the second split mirror 1322 are not parallel to each other and are disposed to cross each other at one point (for example, one far point). That is, the first split mirror 1321 and the second split mirror 1322 are different in reflection direction.

The first collimated beam L21 reflected by the first split mirror 1321 and the second collimated beam L22 reflected by the second split mirror 1322 are guided to cross each other at one point.

Since the first collimated beam L21 and the second collimated beam L22 are not parallel beams and wave fronts thereof do not match, these collimated beams interfere with each other to cause an intensity distribution in a direction of an optical axis AX.

The splitter 130 splits the collimated beam L2 into the first collimated beam L21 and the second collimated beam L22 and emits the split collimated beams L2 to the irradiation unit 20.

Referring back to FIG. 1, the irradiation unit 20 causes the collimated beam L2 incident from the light source unit 10 to converge and guides the converged collimated beam L2 to a light condensing position 23 in the drawing space 2. In the following description, the collimated beam L2 caused to converge by the irradiation unit 20 is also referred to as a converged beam L3. A propagating direction of the converged beam L3 emitted from the irradiation unit 20 is also referred to as an optical axis AX.

As described above, the converged beam L3 is a beam obtained by causing the collimated beam L2 to converge (that is, to decrease in diameter). Accordingly, the converged beam L3 is higher in energy per unit area in the diameter direction than the collimated beam L2. The energy per unit area in the diameter direction of the converged beam L3 is the highest at a most converged (diameter-decreased) position.

That is, the energy of the converged beam L3 incident on the fluorescent material 21 is the highest at a most converged (diameter-decreased) position.

The irradiation unit 20 includes a converger 230 and a scanner 240. The irradiation unit 20 may include a modulator 220.

The modulator 220 includes a spatial phase modulator 221. The spatial phase modulator 221 modulates a phase of at least one collimated beam L2 out of the plurality of collimated beams L2 split by the splitter 130 under the control of the control unit 60.

For example, as illustrated in FIG. 2, the modulator 220 modulates the phase of one of the split first collimated beam L21 and the split second collimated beam L22 (the second collimated beam L22 in the example illustrated in the drawing). The modulator 220 can change an interference state between the collimated beams L2 at a position at which the first collimated beam L21 and the second collimated beam L22 interfere with each other by modulating the phase of the second collimated beam L22.

The modulator 220 emits the collimated beam L2 of which the phase has been modulated (that is, the phase has been controlled) to the converger 230.

The irradiation unit 20 may not include the modulator 220. In this case, the collimated beam L2 incident on the irradiation unit 20 from the light source unit 10 is incident on the converger 230 without passing through the modulator 220. That is, the collimated beams L2 are incident on the converger 230 from the splitter 130 of the light source unit 10.

Referring back to FIG. 1, the converger 230 causes a plurality of collimated beams L2 incident thereon to converge and to generate a plurality of converged beams L3 and causes the plurality of converged beams L3 to interfere with each other at the light condensing position 23. More specifically, the converger 230 includes a converging lens 231. The converging lens 231 can change a position on which the transmitted laser beam L converges (that is, a focal distance) under the control of the control unit 60.

The laser beam L transmitted by the converger 230 includes a first collimated beam L21 and a second collimated beam L22 split by the splitter 130. The converger 230 causes the first collimated beam L21 and the second collimated beam L22 incident thereon to converge. Accordingly, the converged beam L3 emitted from the converger 230 includes a first converged beam L31 based on the first collimated beam L21 and a second converged beam L32 based on the second collimated beam L22.

The scanner 240 includes a scan mirror 241 (for example, a galvano mirror or a polygon mirror) and changes an irradiation direction of the laser beam L caused to converge by the converger 230.

Here, a direction in which the scanner 240 scans the drawing space 2 will be described using a XYZ three-dimensional orthogonal coordinate system.

The X axis and the Y axis of the three-dimensional orthogonal coordinate system represent angles of view when the drawing space 2 is seen from the irradiation unit 20. The X axis represents a horizontal direction (a left-right direction in FIG. 1) of the drawing space 2. The Y axis represents a depth direction (a depth direction in FIG. 1) of the drawing space 2. The scanner 240 can emit the converged beam L3 to an arbitrary position in the XY plane of the drawing space 2 by changing the direction of the scan mirror 241. That is, the scanner 240 can be said to be a two-dimensional scanner that two-dimensionally scans the XY plane with the converged beam L3.

The Z axis of the three-dimensional orthogonal coordinate system represents a depth when the drawing space 2 is seen from the irradiation unit 20. The converger 230 can change the light condensing position 23 of the converged beam L3 in the Z-axis direction by changing a converging position of the converged beam L3 (a focal distance of the converging lens 231). That is, the converger 230 and the scanner 240 can also be said to be a three-dimensional scanner that three-dimensionally scans the XYZ space with the converged beam L3. In the following description, a three-dimensional scanner including the converger 230 and the scanner 240 are also simply referred to as a scanner.

In an example of the present embodiment, the drawing space 2 has a cylindrical shape. The scanner 240 causes the converged beam L3 to be incident on the drawing space 2 from a bottom surface of the cylindrical shape of the drawing space 2. In this example, the XY plane represents a plane parallel to the bottom surface of the drawing space 2. The Z axis represents the height of the cylindrical shape of the drawing space 2.

The scanner 240 three-dimensionally scans the light condensing position 23 of the laser beam L by using the drawing space 2 including the fluorescent material 21 which is excited to spontaneously emit light with irradiation with a laser beam L as a scan target range and changing the focal distance at which the converged beam L3 converges and a direction of the optical axis AX in which the converged beam L3 is emitted.

The laser beam L (that is, the converged beam L3) emitted from the scanner 240 includes the first converged beam L31 based on the first collimated beam L21 and the second converged beam L32 based on the second collimated beam L22 which are split by the splitter 130.

Here, the scanner 240 includes a single scan mirror 241. The scanner 240 changes the directions of the optical axes AX in which the plurality of converged beams L3 (for example, the first converged beam L31 and the second converged beam L32) incident on the single scan mirror 241 are emitted together.

That is, the scanner 240 three-dimensionally scans the light condensing position 23 by using the drawing space 2 including the fluorescent material 21 which is excited to spontaneously emit light with irradiation with a laser beam L as a scan target range and changing the focal distance at which the converged beam L3 is caused to converge by the converger 230 and the directions of the optical axes AX (that is, optical axis directions) in which the plurality of converged beams L3 are emitted using the single scan mirror 241 (an example of an optical axis direction changing element) together.

Since the scanner 240 is constituted by the single scan mirror 241 in this way, it is possible to change irradiation directions of a plurality of converged beams L3 together.

Here, when the irradiation directions of the converged beams L3 are changed using a plurality of scan mirrors, a mechanical error may occur between angles of the plurality of scan mirrors. When an error occurs between the angles of the plurality of scan mirrors, an error of an interference state between the converged beams L3 at the converging position of the first converged beam L31 and the second converged beam L32 occurs. That is, when the configuration in which a plurality of converged beams L3 are emitted by a plurality of scan mirrors is employed, it is difficult to control the interference state between the converged beams L3.

On the other hand, since the scanner 240 according to the present embodiment is constituted by the single scan mirror 241, a mechanical error does not occur between the irradiation directions of the plurality of converged beams L3. Accordingly, with the scanner 240 according to the present embodiment, it is possible to easily control the interference state between the converged beams L3.

In the present embodiment, the scanner 240 may include a light intensity adjuster (for example, an iris) for adjusting an emitted light intensity of the laser beam L (the collimated beam L2 or the converged beam L3) or a cutoff element (for example, a shutter) for cutting off emission of the laser beam L (both of which are not illustrated). The light intensity adjuster or the cutoff element are controlled in synchronization with the converger 230 and the scanner 240, and thus the light condensing position 23 of the converged beam L3 is controlled at an arbitrary position in the drawing space 2.

The converged beam L3 is used as an excitation beam for exciting the fluorescent material 21 at the light condensing position 23 in the drawing space 2. A light emission intensity of the fluorescent material 21 is proportional to the intensity of the excitation beam (that is, the intensity of the converged beam L3 converging on the light condensing position 23). The converged beam L3 converges on the light condensing position 23 and thus increases in energy per unit volume (that is, a volume energy density). Accordingly, the fluorescent material 21 strongly emits light at the light condensing position 23.

In the following description, a position on which the converged beam L3 converges most in the light condensing position 23 is also referred to as a condensing point.

The irradiation unit 20 draws a stereoscopic image 22 in the drawing space 2 by scanning the positions in the drawing space 2 as the light condensing position 23 using the converger 230 and the scanner 240 (that is, the three-dimensional scanner).

The irradiation unit 20 may perform scanning based on s-called vector scan or scanning based on so-called raster scan in the drawing space 2.

The storage unit 30 has a known storage function, for example, a semiconductor storage device or a magnetic storage device and stores various types of information used by the control unit 60.

The control unit 60 is, for example, a computer device and provides a predetermined function on the basis of programs and data stored in the storage unit 30. The control unit 60 includes an intensity control unit 620 and a phase control unit 640 as functional units thereof.

The intensity control unit 620 controls the intensity of the laser beam L emitted from the irradiation unit 20 on the basis of drawing data stored in the storage unit 30. Drawing data is information indicating brightness of an image at each three-dimensional position in the drawing space 2. That is, the drawing data is information for displaying a stereoscopic image 22.

The intensity control unit 620 controls the intensity of the laser beams L such that each of the plurality of converged beams L3 has an intensity with which the fluorescent material 21 does not emit light and has an intensity with which the fluorescent material 21 emits light when the plurality of converged beams L3 interfere with each other at the condensing point of the light condensing position 23.

For example, an intensity control table (not illustrated) is stored in advance in the storage unit 30. The intensity control table is information indicating the intensity of the laser beam L which has been calculated in advance on the basis of various parameters such as characteristics of the laser beam L such as a wavelength, a beam diameter, and interference characteristics of the laser beam L, a dimension of the drawing space 2, characteristics of the drawing space 2 such as a concentration of the fluorescent material 21 in the drawing space 2 and light emission characteristics of the fluorescent material 21, and characteristics of an installation situation of the stereoscopic display device 1 such as an optical path length from the irradiation unit 20 to the drawing space 2 and ambient brightness of the drawing space 2. The intensity control unit 620 controls the intensity of the laser beam L with reference to the intensity control table stored in the storage unit 30 of the stereoscopic display device 1.

The intensity control unit 620 may acquire the various parameters changing in the installation situation of the stereoscopic display device 1 and variably control the intensity of the laser beam L according to the acquired parameters. For example, the intensity control unit 620 may acquire ambient brightness of the drawing space 2 and variably control the intensity of the laser beam L according to the acquired ambient brightness of the drawing space 2.

The phase control unit 640 controls the phase of at least one collimated beam L2 out of a plurality of collimated beams L2 from the light source unit 10. As described above, the irradiation unit 20 according to the present embodiment may include the modulator 220. The phase control unit 640 controls the phase of at least one (for example, the second collimated beam L22) out of the plurality of collimated beams L2 by controlling the spatial phase modulator 221 provided in the modulator 220.

For example, the phase control unit 640 detects a light emission state of the fluorescent material 21 forming a stereoscopic image 22 using a known means. The phase control unit 640 determines whether the light emission state of the fluorescent material 21 is a predetermined state (for example, brightness defined by drawing data). When the light emission state of the fluorescent material 21 departs form a predetermined state, the phase control unit 640 controls the modulator 220 such that the light emission state of the fluorescent material 21 becomes close to the predetermined state.

[Operations of Stereoscopic Display Device 1]

An example of a flow of operations of the stereoscopic display device 1 will be described below with reference to FIG. 3.

Figure 3:
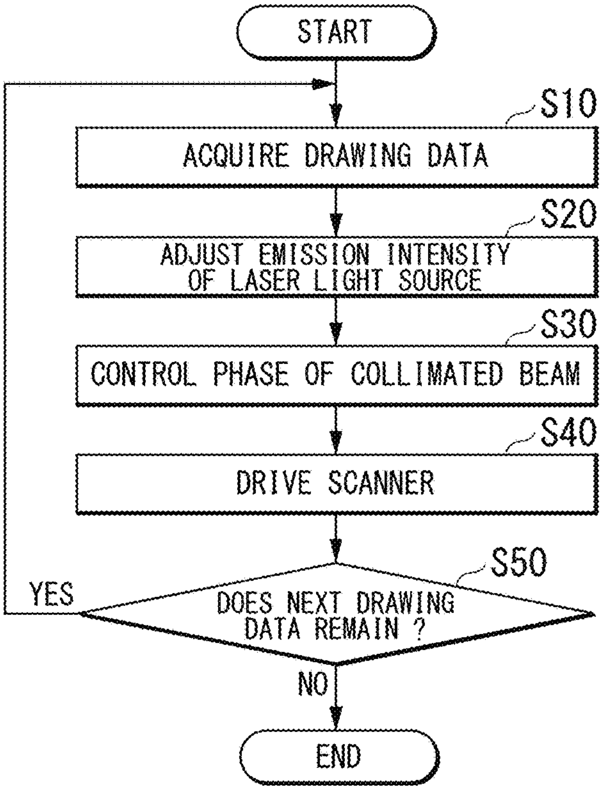
FIG. 3 A diagram illustrating an example of a flow of operations that are performed by the stereoscopic display device according to the embodiment.

FIG. 3 is a diagram illustrating an example of a flow of operations of the stereoscopic display device 1 according to the present embodiment.

(Step S10) The control unit 60 acquires drawing data from the storage unit 30. As described above, the drawing data is information for displaying a stereoscopic image 22.

(Step S20) The control unit 60 controls an irradiation intensity of a laser beam L by controlling the laser light source 110.

(Step S30) The control unit 60 controls the phase of the collimated beams L2 by controlling the spatial phase modulator 221 of the modulator 220.

(Step S40) The control unit 60 controls the light condensing position 23 of the converged beam L3 by controlling the converging lens 231 of the converger 230 and the scan mirror 241 of the scanner 240 (that is, driving the scanner).

(Step S50) When scanning of three-dimensional positions indicated by the drawing data ends, the control unit 60 determines whether next drawing data remains. When it is determined that next drawing data remains (Step S40: YES), the control unit 60 returns the flow of operations to Step S10 and continues to perform the flow of operations. When it is determined that next drawing data does not remain (Step S40: NO), the control unit 60 ends the flow of operations.

[Relationship Between Intensity of Excitation Beam (Laser Beam L) and Light Emission State of Fluorescent Material]

An example of a condensing state at the light condensing position 23 according to the present embodiment will be described with reference to FIG. 4.

Figure 4:
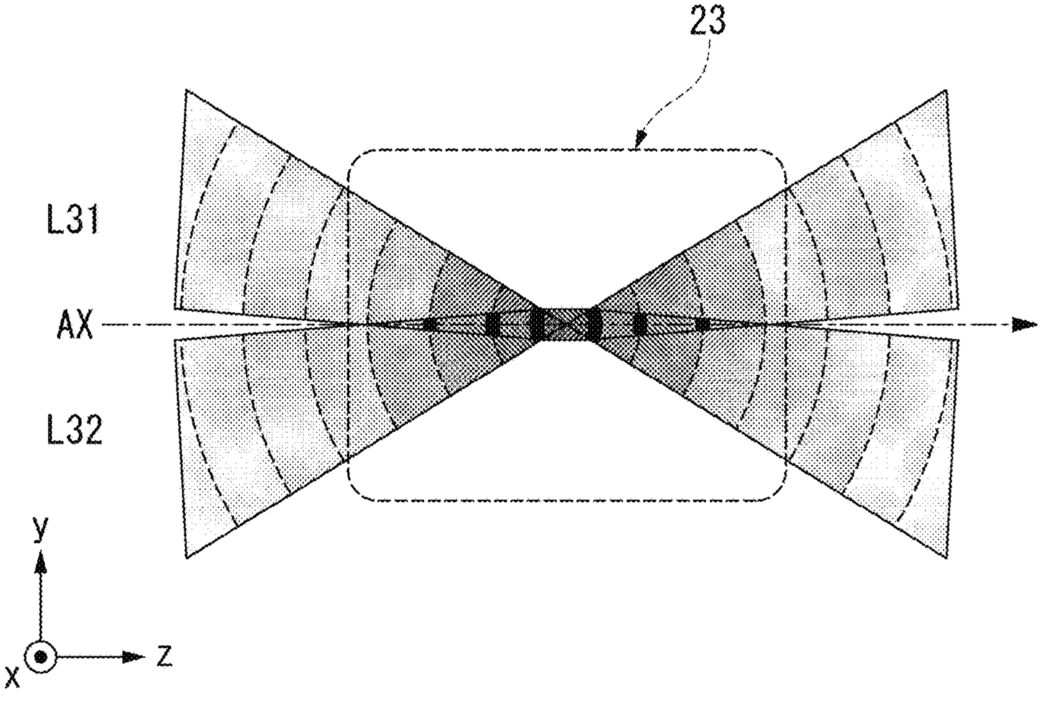
FIG. 4 A diagram illustrating an interference state of a converged beam emitted from the stereoscopic display device according to the embodiment.

FIG. 4 is a diagram illustrating an interference state of a converged beam L3 emitted from the stereoscopic display device 1 according to the present embodiment. The drawing schematically illustrates an interference state in the direction of the optical axis AX (the Z-axis direction) at the light condensing position 23 at which the converged beam L3 emitted from the stereoscopic display device 1 converges.

A first converged beam L31 and a second converged beam L32 emitted from the irradiation unit 20 converge at the light condensing position 23, and these two converged beams L3 interfere with each other.

Through this interference between the plurality of converged beams L3, an intensity distribution of excitation energy in the optical axis AX direction of the light condensing position 23 is caused.

A model of calculating incident energy of the converged beam L3 at the light condensing position 23 will be described below with reference to FIG. 5.

Figure 5:
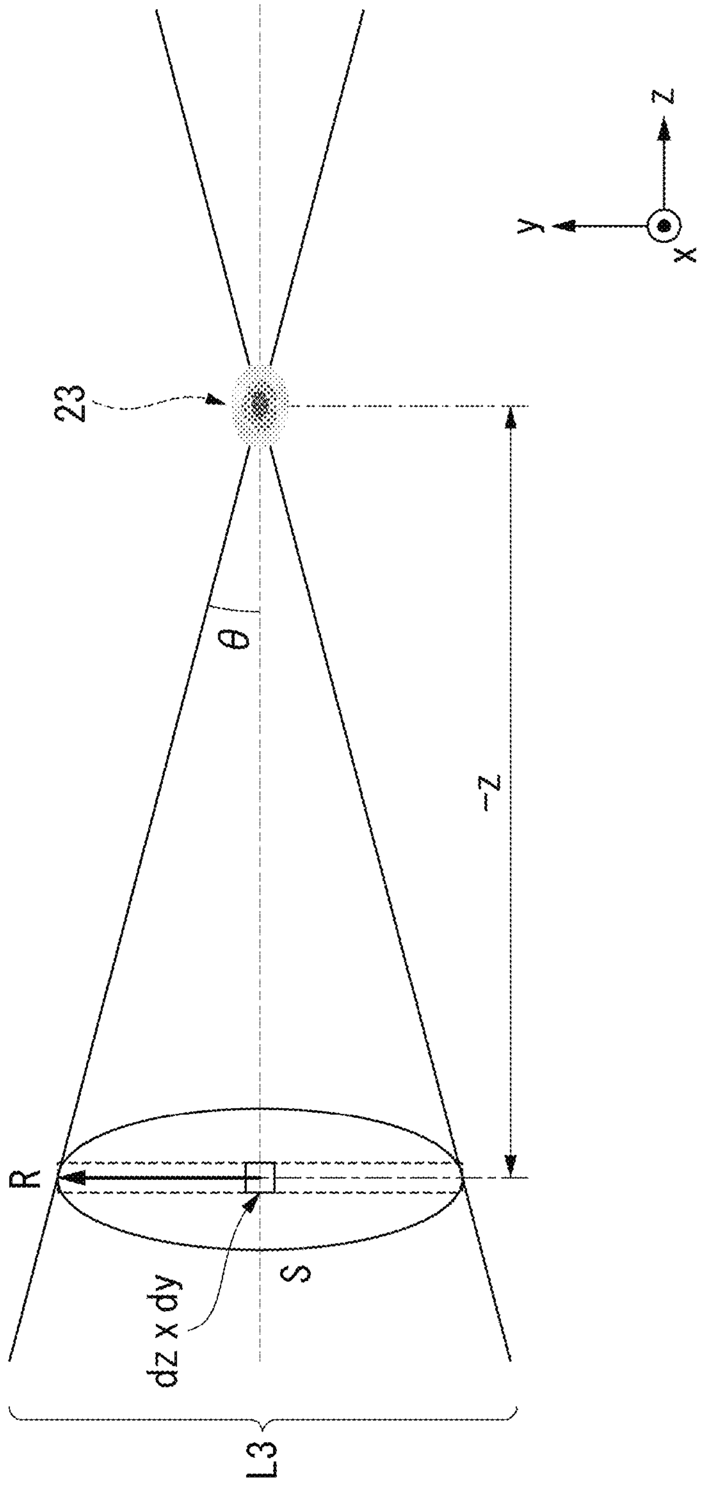
FIG. 5 A diagram illustrating an example of a model of calculating incident energy of a converged beam at a light condensing position according to the embodiment.

FIG. 5 is a diagram illustrating an example of a model of calculating incident energy of a converged beam L3 at the light condensing position 23 according to the present embodiment. The converged beam L3 emitted from the irradiation unit 20 has a conical shape with the optical axis AX as the center and with the condensing point of the light condensing position 23 as a vertex. In the drawing, the direction of the optical axis AX matches the Z-axis direction. An angle θ is a half of a vertical angle of a cone (that is, an angle formed by the optical axis AX and a generating line of the cone). An area S is an area of a virtual disc (a cross-section of a cone) which is perpendicular to the optical axis AX and which has a radius R at a position apart by a distance z in the −Z direction (that is, toward the irradiation unit 20) from the condensing point of the light condensing position 23. A length dz is a thickness of the virtual disc (a minute length in the Z-axis direction).

The area S of the virtual disc can be expressed as a function with the distance z from the condensing point and the angle θ and becomes smaller as it becomes closer to the condensing point.

Accordingly, when the fluorescent material 21 is uniformly distributed in the drawing space 2, the number of particles of the fluorescent material 21 included in a volume (S×dz) of the virtual disc becomes smaller as it becomes closer to the condensing point. That is, the number of particles of the fluorescent material 21 included in the volume (S×dz) of the virtual disc becomes larger as it goes apart in the Z-axis direction from the condensing point with the condensing point as a minimum value.

The converged beam L3 incident on the drawing space 2 propagates while causing the fluorescent material 21 on the optical path in the drawing space 2 to emit light. Accordingly, the converged beam L3 decreases in energy by the number of particles of the fluorescent material 21×quantum efficiency according to a distance into the fluorescent material 21.

When incident energy of the converged beam L3 on the virtual disc is divided by the area S of the virtual disc, the energy density per cross-section is calculated. This energy density increases rapidly in the vicinity of the condensing point of the light condensing position 23 at which the area S is smaller.

A light intensity emitted from the fluorescent material 21 is proportional to the energy density of an excitation beam (that is, the converged beam L3). Accordingly, the light intensity emitted from the fluorescent material 21 increases rapidly in the vicinity of the condensing point of the light condensing position 23. As a result, the stereoscopic display device 1 can draw a stereoscopic image 22 by controlling the position of the condensing point in the drawing space 2 such that the fluorescent material 21 emits light at an arbitrary position in the drawing space 2.

The fluorescent material 21 is uniformly distributed in the drawing space 2. Accordingly, when a converged beam L3 is emitted from the irradiation unit 20 to the light condensing position 23, the fluorescent material 21 on the optical axis AX of the converged beam L3 absorbs much excitation energy and emits light. When this state is seen by an observer 400 who observes the drawing space 2, the optical path of the converged beam L3 incident on the drawing space 2 becomes visible. That is, light is emitted at a position other than the condensing point which should originally emit light, and a decrease in contrast of a stereoscopic image 22 is caused. When the fluorescent material 21 on the optical path of the converged beam L3 from the irradiation unit 20 to the condensing position 23 can be caused not to emit light and the fluorescent material 21 can be caused to emit light at only the condensing point of the light condensing position 23, it is possible to enhance contrast of the stereoscopic image 22 and to improve image quality of the stereoscopic image 22.

The stereoscopic display device 1 according to the present embodiment emits a plurality of converged beams L3 from the irradiation unit 20 and causes the plurality of emitted converged beams L3 to interfere with each other at the condensing point. With the stereoscopic display device 1, by setting excitation energy at the condensing point of the converged beams L3 to be higher than that in the middle of the optical path to curb emission of light of the fluorescent material 21 on the optical axis AX of the converged beams L3, it is possible to improve image quality of the stereoscopic image 22.

Figure 6:
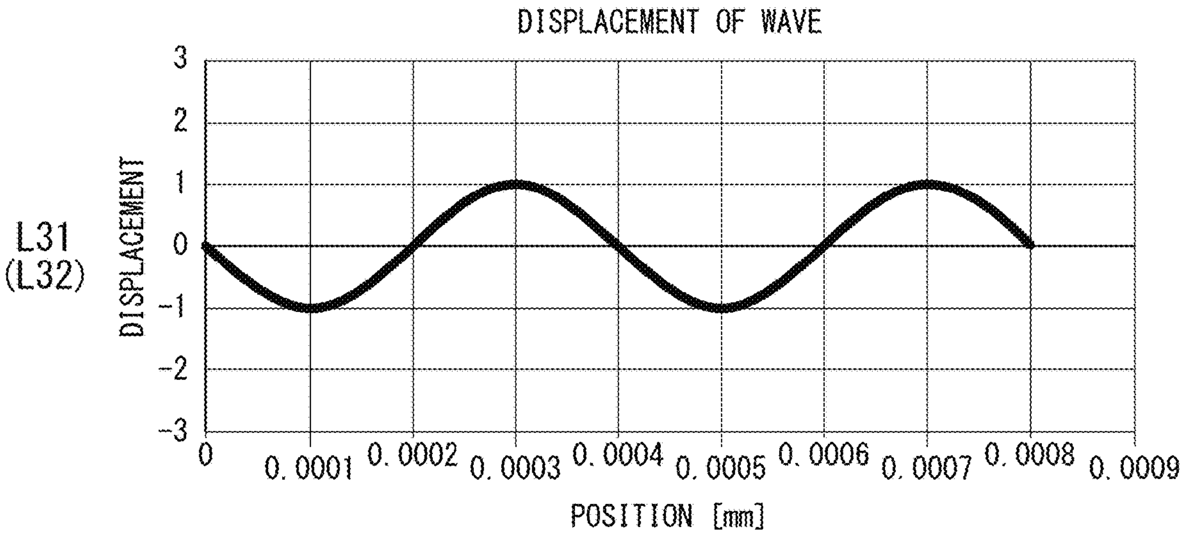
FIG. 6 A diagram illustrating an example of displacement characteristics of waves of a converged beam.

FIG. 6 is a diagram illustrating an example of displacement characteristics of waves of a converged beam L3. In the drawing, both displacement of the first converged beam L31 and displacement of the second converged beam L32 are expressed by normalization in ±1. In this example, both the first converged beam L31 and the second converged beam L32 have a wavelength 0.0004 [mm] and do not have a phase difference.

Figure 7:
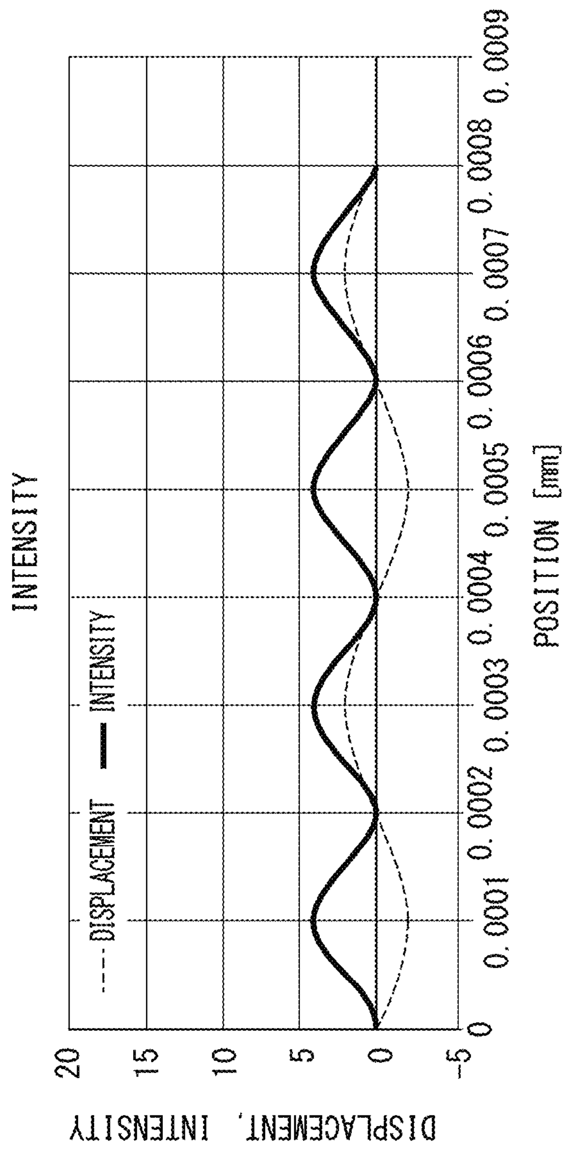
FIG. 7 A diagram illustrating an example of interference characteristics between a plurality of converged beams.

FIG. 7 is a diagram illustrating an example of interference characteristics between a plurality of converged beams L3. When the first converged beam L31 and the second converged beam L32 illustrated in FIG. 6 interfere with each other at the light condensing position 23, the intensity of the laser beam L after interference is a square of a sum of intensities of the original converged beams L3 (that is, the first converged beam L31 and the second converged beam L32).

For example, when displacement (amplitude) of both the first converged beam L31 and displacement of the second converged beam L32 is ±1, the maximum value of the intensities of the laser beams L after interference is 4. On the other hand, the maximum value of the intensities of the converged beams L3 (the first converged beam L31 and the second converged beam L32) before interference is 1. That is, the intensity of the laser beam L after interference is larger than the intensity of the laser beam L before interference. In this example, the intensity of the laser beam L after interference is four times the intensity of the laser beam L before interference.

Here, when the optical system of a laser beam Lis disposed such that a plurality of laser beams L do not interfere with each other until reaching the light condensing position 23 and interfere with each other at the light condensing position 23 (particularly, the condensing point), the fluorescent material 21 is less likely to emit light until reaching the light condensing position 23 and can be caused to strongly emit light at the light condensing position 23. That is, when the optical system of a laser beam Lis disposed such that a plurality of laser beams L do not interfere with each other until reaching the light condensing position 23 and interfere with each other at the light condensing position 23 (particularly, the condensing point), it is possible to enhance contrast of a stereoscopic image 22 in the drawing space 2 and to improve image quality of the stereoscopic image 22.

With the stereoscopic display device 1 according to the present embodiment, since the optical system of a laser beam Lis disposed such that a plurality of laser beams L do not interfere with each other until reaching the light condensing position 23 and interfere with each other at the light condensing position 23 (particularly, the condensing point), it is possible to improve image quality of the stereoscopic image 22.

Since the stereoscopic display device 1 according to the present embodiment includes the phase control unit 640, it is possible to change the interference state between a plurality of converged beams L3 at the light condensing position 23. With the stereoscopic display device 1 having this configuration, it is possible to change the level of excitation energy at the light condensing position 23 and to improve image quality of the stereoscopic image 22.

[Modified Example]

Figure 8:
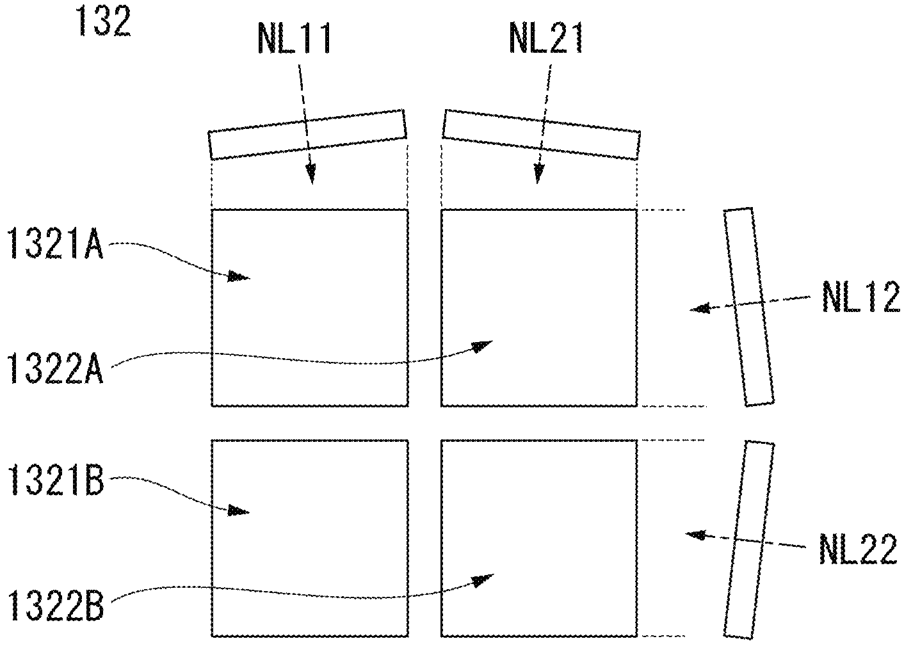
FIG. 8 A diagram illustrating a modified example of a configuration of a split mirror according to the embodiment.

FIG. 8 is a diagram illustrating a modified example of the configuration of the split mirror 132 according to the present embodiment. In the aforementioned embodiment, the split mirror 132 includes two split mirrors of the first split mirror 1321 and the second split mirror 1322, but the present invention is not limited thereto. As illustrated in the drawing, the split mirror 132 may include four split mirrors. In this case, the split mirror 132 is divided into four parts such as a 11-th split mirror 1321A, a 12-th split mirror 1321B, a 21-th split mirror 1322A, and a 22-th split mirror 1322B. A normal line NL11 of the 11-th split mirror 1321A, a normal NL12 of the 12-th split mirror 1321B, a normal line NL21 of the 21-th split mirror 1322A, and a normal line NL22 of the 22-th split mirror 1322B are disposed in different directions such as they converge on one far point.

A converged beam L3 emitted from the 11-th split mirror 1321A is also referred to as a first converged beam L31, a converged beam L3 emitted from the 12-th split mirror 1321B is also referred to as a second converged beam L32, a converged beam L3 emitted from the 21-th split mirror 1322A is also referred to as a third converged beam L33, and a converged beam L3 emitted from the 22-th split mirror 1322B is also referred to as a fourth converged beam L34.

Figure 9:
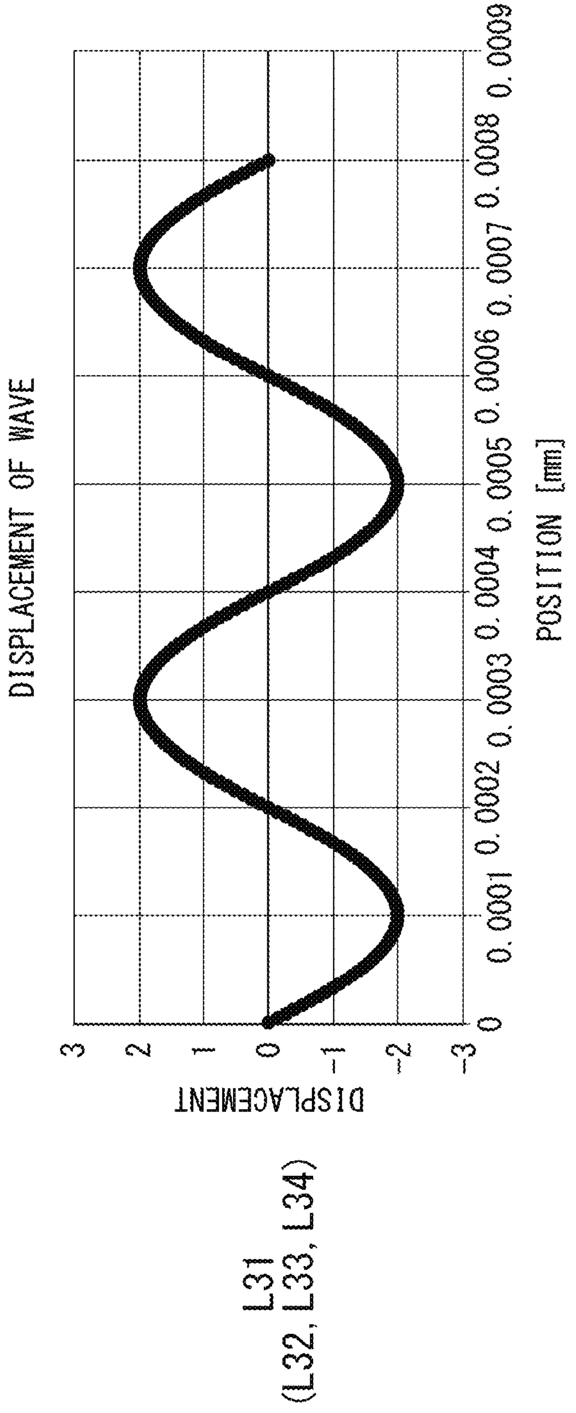
FIG. 9 A diagram illustrating an example of displacement characteristics of waves of a converged beam according to the modified example.

FIG. 9 is a diagram illustrating an example of displacement characteristics of waves of a converged beam L3 according to the present modified example. In the drawing, all displacement of the first converged beam L31, the second converged beam L32, the third converged beam L33, and the fourth converged beam L34 are expressed by normalization in ±11. Actually, the first to fourth converged beams L31 to L34 simultaneously overlap and interfere with each other at the light condensing position 23, but it is assumed herein that two light fluxes overlap for the purpose of convenience of description. FIG. 9 first illustrates a state in which two converged beams, for example, the first converged beam L31 and the second converged beam L32, overlap each other at the light condensing position 23 similarly to FIG. 7, and the amplitude is ±2. Similarly, even in a state in which the third converged beam L33 and the fourth converged beam L34 overlap each other, the amplitude is ±2. In this case, all the first converged beam L31, the second converged beam L32, the third converged beam L33, and the fourth converged beam L34 have a wavelength 0.0004 [mm] and have no phase difference.

Figure 10:
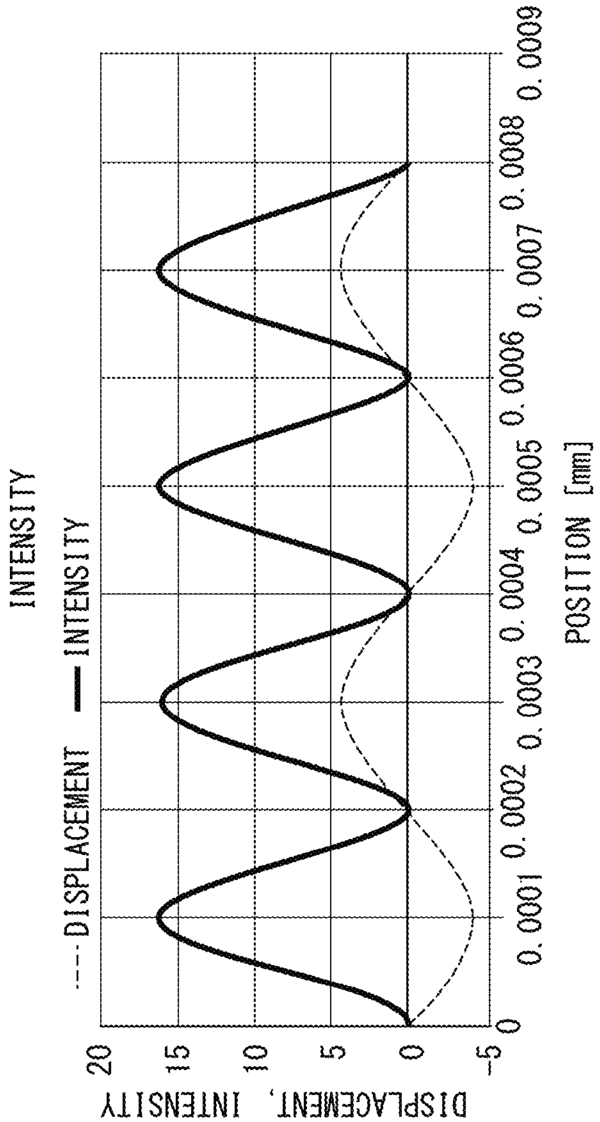
FIG. 10 A diagram illustrating an example of interference characteristics between a plurality of converged beams according to the modified example.

FIG. 10 is a diagram illustrating an example of interference characteristics between a plurality of converged beams L3 in the present modified example. When overlap of the first converged beam L31 and the second converged beam L32 illustrated in FIG. 9 and overlap of the third converged beam L33 and the fourth converged beam L34 interfere with each other at the light condensing position 23, the intensity of the laser beam L after interference is a square of a sum of the amplitude of the original converged beams L3.

For example, when both displacement (amplitude) of waves in which the first converged beam L31 and the second converged beam L32 overlap and displacement (amplitude) of waves in which the third converged beam L33 and the fourth converged beam L34 overlap are ±2, the amplitude of the laser beam L after interference is ±4, and a maximum value of the intensity is 16. On the other hand, each maximum value of the intensities of the converged beams L3 before interference (the first converged beam L31, the second converged beam L32, the third converged beam L33, and the converged beam L34) is 1. That is, the intensity of the laser beam L after interference is higher than the intensity of the laser beam L before interference. In this example, the intensity of the laser beam L after interference is 16 times the intensity of the laser beam L before interference.

In the stereoscopic display device 1, when the split mirror 132 is split into four parts, the converged beams L3 emitted from the irradiation unit 20 is split into four parts. As the number of parts of the split mirror 132 becomes larger, a ratio of the intensity of the converged beam L3 after interference to the intensity of the converged beam L3 before interference can become higher, and it is possible to more improve the contrast of the stereoscopic image 22.

In this modified example, the stereoscopic display device 1 performs scanning with the split converged beams L3 using the single scan system (for example, the single converging lens 231 and the single scan mirror 241), and thus it is possible to decrease a mechanical error between the interference positions of the converged beams L3.

The number of parts of the split mirror 132 is two or four, but the present invention is not limited to this example. When the number of parts of the split mirror 132 is equal to or greater than 2, the number of parts is not particularly limited. The aforementioned description is based on the premise that the split mirror 132 is a plane mirror, but the present invention is not limited thereto. For example, the split mirror 132 may be a concave mirror. In this case, the splitter 130 may divide an optical path using a light blocking mask or the like for blocking a part of the optical path of the collimated beam L2 and then cause the collimated beam to be incident on the split mirror 132 which is a concave mirror. With the splitter 130 including the light blocking mask and the concave mirror, it is possible to easily increase the number of divided parts of the laser beam L and to decrease a mechanical error for matching the optical axes AX of a plurality of plane mirrors.

[Other Modified Examples]

Figure 11:
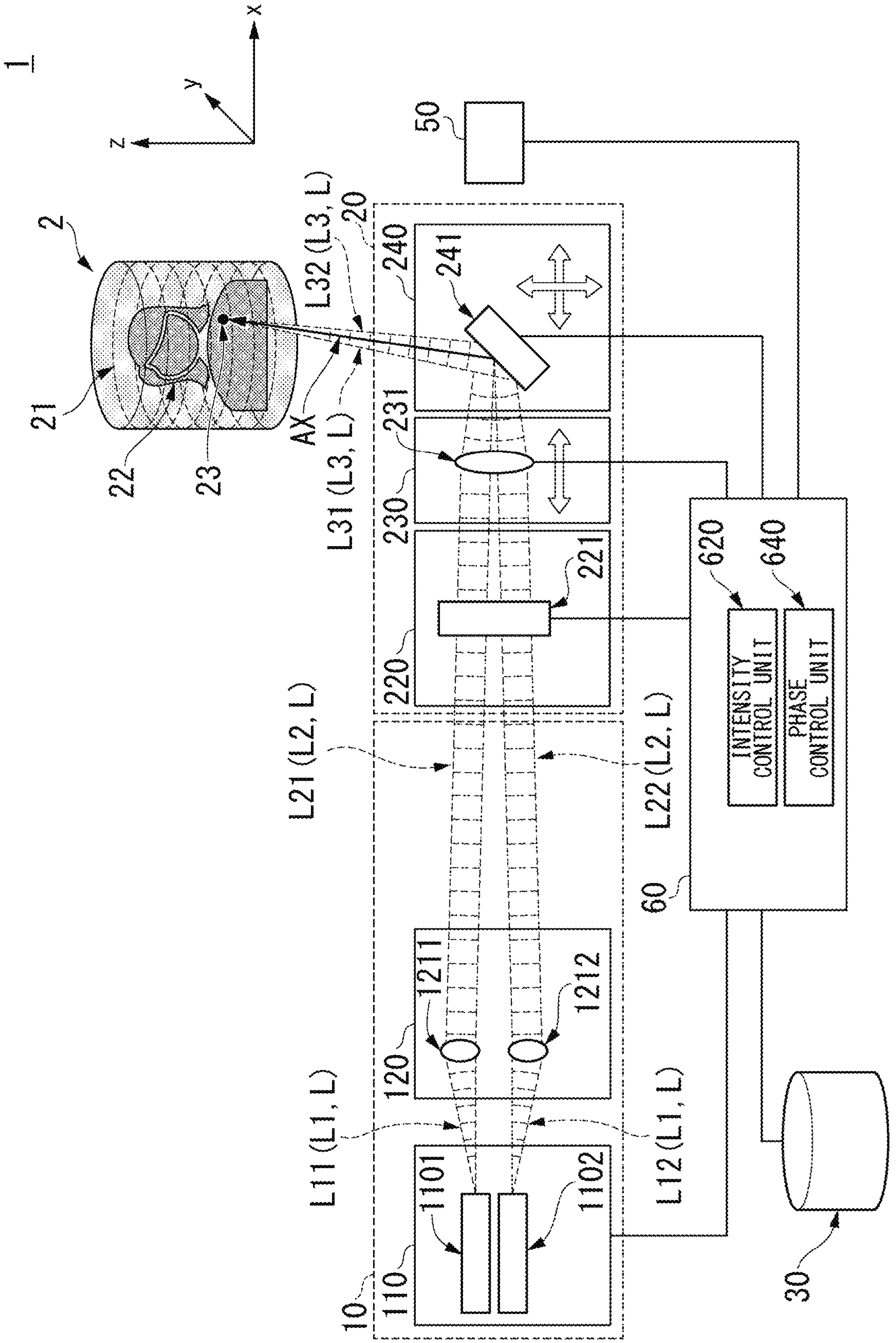
FIG. 11 A diagram illustrating a modified example of a configuration of a stereoscopic display device according to the embodiment.

FIG. 11 is a diagram illustrating a modified example of the configuration of the stereoscopic display device 1 according to the present embodiment. The stereoscopic display device 1 may have any configuration as long as it can emit a plurality of laser beams L interfering with each other at the light condensing position 23. In the aforementioned embodiment, the stereoscopic display device 1 splits a laser beam L emitted from the single laser light source 110 into a plurality of laser beams L using the splitter 130, but the present invention is not limited thereto.

In this modified example, the laser light source 110 of the stereoscopic display device 1 includes a plurality of light sources including a first laser light source 1101 and a second laser light source 1102. The laser light source 110 emits a first source beam L11 and a second source beam L12.

That is, the stereoscopic display device 1 according to this modified example includes a plurality of laser light sources 110 (for example, the first laser light source 1101 and the second laser light source 1102) each emitting a laser beam L. The converter 120 converts the laser beam L emitted from each laser light source 110 to a collimated beam L2 with a predetermined diameter.

The collimating lens 121 includes a first collimating lens 1211 and a second collimating leans 1212. The first collimating lens 1211 emits the first collimated beam L21. The second collimating lens 1212 emits the second collimated beam L22. The first collimating lens 1211 and the second collimating lens 1212 are disposed to face each other slightly inward. That is, an exit axis of the first collimating lens 1211 and an exit axis of the second collimating leans 1212 are not parallel to each other, and the first collimating lens 1211 and the second collimating lens 1212 are disposed such that they cross each other at one point.

The light source unit 10 emits the plurality of collimated beams L2 on which conversion has been performed by the converter 120.

The converger 230 causes a plurality of collimated beams L2 incident from the light source unit 10 to converge and causes the plurality of collimated beams L2 to interference with each other at the light condensing position 23.

With the stereoscopic display device 1 having this configuration, it is possible to set the intensity of a converged beam L3 after interference to be higher than the intensity of a converged beam L3 before interference and to more improve the contrast of a stereoscopic image 22.

In this modified example, since the stereoscopic display device 1 performs scanning with the split converged beams L3 using a single scan system (for example, the single converging lens 231 and the single scan mirror 241), it is possible to decrease a mechanical error between the interference positions of the converged beams L3.

As described above, the stereoscopic display device 1 according to the present embodiment includes an optical system splitting a converged beam L3 into a plurality of light fluxes or causing a plurality of converged beams L3 to be incident on the drawing space 2 by including a plurality of light sources and causing the plurality of converged beams L3 to interfere with each other at the light condensing position 23. Accordingly, with the stereoscopic display device 1 according to the present embodiment, it is possible to decrease the intensities of the converged beams L3 incident on the drawing space 2 such that emission of light from the fluorescent material 21 is sufficiently curbed and to apply excitation energy to the fluorescent material 21 such that the fluorescent material 21 can sufficiently emit light at the light condensing position 23. Accordingly, with the stereoscopic display device 1 according to the present embodiment, it is possible to curb emission of light from the fluorescent material 21 in the middle way of the converged beam L3 propagating from the incidence position in the drawing space 2 to the light condensing position 23 and to improve the contrast of the stereoscopic image 22. That is, with the stereoscopic display device 1 according to the present embodiment, it is possible to improve image quality of the stereoscopic image 22.

Second Embodiment

A second embodiment will be described below. The same constituents as in the first embodiment will be referred to by the same reference signs, and description thereof will be omitted.

[Functional Configuration of Stereoscopic Display Device 1]

A configuration of the stereoscopic display device 1 according to the present embodiment is the same as described above with reference to FIG. 11 as the modified example of the first embodiment, and thus repeated description thereof will be omitted.

A light source unit 10 according to the present embodiment includes a laser light source 110 and a converter 120. That is, the light source unit 10 according to the present embodiment is different from the light source unit 10 according to the present embodiment in that the splitter 130 is not necessarily provided.

The light source unit 10 according to the present embodiment includes a plurality of sets of the laser light source 110 and the converter 120. Specifically, the light source unit 10 includes a first laser light source 1101 and a second laser light source 1102 which are included in the laser light source 110 and a first collimating lens 1211 and a second collimating lens 1212 which are included in the collimating lens 121.

The first laser light source 1101 and the first collimating lens 1211 constitute one set of light sources, and the second laser light source 1102 and the second collimating lens 1212 constitute another set of light sources.

In the laser light source 110, the first laser light source 1101 emits a first source beam L11. The second laser light source 1102 emits a second source beam L12.

In the following description, it is assumed that a wavelength of the first source beam L11 emitted from the first laser light source 1101 and a wavelength of the second source beam L12 emitted from the second laser light source 1102 match each other unless otherwise mentioned.

For example, in the present embodiment, both the wavelength of the first source beam L11 emitted from the first laser light source 1101 and the wavelength of the second source beam L12 emitted from the second laser light source 1102 are 1000 [nm] (0.001 [mm]).

The plurality of laser light sources 110 included in the light source unit 10 may be different in wavelength of the laser beams L emitted therefrom. That is, the wavelength of the first source beam L11 emitted from the first laser light source 1101 and the wavelength of the second source beam L12 emitted from the second laser light source 1102 may be slightly different. For example, the wavelength λ1 of the first source beam L11 emitted from the first laser light source 1101 is 1000 [nm] (0.001 [mm]). The wavelength 22 of the second source beam L12 emitted from the second laser light source 1102 is 960 [nm] (0.00096 [mm]).

Here, "slight difference" in wavelength means that a difference in wavelength between laser beams L is within about 10% (for example, a difference of ±100 [nm] with respect to a wavelength 1000 [nm]).

In the following description, a case in which the wavelength of the first source beam L11 and the wavelength of the second source beam L12 match is also referred to as "single-wavelength light source." A case in which the wavelength of the first source beam L11 and the wavelength of the second source beam L12 do not match (particularly, a case in which the wavelength of the first source beam L11 and the wavelength of the second source beam L12 are slightly different) is also referred to as "two-wavelength light source."

Out of the collimating lenses 121 of the converter 120, the first collimating lens 1211 converts the first source beam L11 to a first collimated beam L21. The second collimating lens 1212 converts the second source beam L12 to a second collimated beam L22.

The light source unit 10 emits a plurality of collimated beams L2 (the first collimated beam L21 and the second collimated beam L22).

The irradiation unit 20 includes a modulator 220, a converger 230, and a scanner 240.

The modulator 220 includes a spatial phase modulator 221. The spatial phase modulator 221 modulates a phase of at least one collimated bean L2 out of the plurality of collimated beams L2 (the first collimated beam L21 and the second collimated beam L22) emitted from the light source unit 10 under the control of the control unit 60. For example, the modulator 220 according to the present embodiment modulates a phase of the second collimated beam L22. The spatial phase modulator 221 may be configured to modulate the phases of all the plurality of collimated beams L2.

The converger 230 causes the plurality of collimated beams L2 incident from the modulator 220 to converge and to generated a plurality of converged beams L3 and causes the plurality of converged beams L3 to interfere with each other at the light condensing position 23.

The laser beam L transmitted by the converger 230 includes the first collimated beam L21 and the second collimated beam L22. The converger 230 causes the first collimated beam L21 and the second collimated beam L22 which are incident thereon to converge. Accordingly, the converged beams L3 emitted from the converger 230 includes a first converged beam L31 based on the first collimated beam L21 and a second converged beam L32 based on the second collimated beam L22.

The laser beam L (that is, the converged beam L3) emitted from the scanner 240 includes the first converged beam L31 based on the first collimated beam L21 and the second converged beam L32 based on the second collimated beam L22.

The phase control unit 640 controls the phase of at least one collimated beam L2 out of a plurality of collimated beams L2 from the light source unit 10. The phase control unit 640 controls the phase of at least one (for example, the second collimated beam L22) out of a plurality of collimated beams L2 by controlling the spatial phase modulator 221 included in the modulator 220.

For example, the phase control unit 640 detects a light emission state of the fluorescent material 21 forming a stereoscopic image 22 using a known means. The phase control unit 640 determines whether the light emission state of the fluorescent material 21 is a predetermined state (for example, brightness defined by drawing data). When the light emission state of the fluorescent material 21 is departs from the predetermined state, the phase control unit 640 controls the modulator 220 such that the light emission state of the fluorescent material 21 becomes close to the predetermined state.

The phase control unit 640 controls the interference state of the first converged beam L31 and the second converged beam L32 at the light condensing position 23 by controlling a modulation state using the spatial phase modulator 221. For example, the phase control unit 640 controls the plurality of converged beams L3 such that they have the same phase at the light condensing position 23.

A flow of operations of the stereoscopic display device 1 according to the present embodiment is the same as the flow described above in the first embodiment with reference to FIG. 3, and description thereof will be omitted.

The stereoscopic display device 1 according to the present embodiment emits a plurality of converged beams L3 from the irradiation unit 20 and causes the plurality of emitted converged beams L3 to interfere with each other at the condensing point. With the stereoscopic display device 1, it is possible to improve image quality of the stereoscopic image 22 by increasing the excitation energy at the condensing point of the converged beams L3 to be higher than that in the middle of the optical path and curbing emission of light from the fluorescent material 21 on the optical axis AX of the converged beam L3.

Specific examples of an interference situation between the converged beams L3 at the light condensing position 23 will be divisionally described below in (1) single-wavelength light source and (2) two-wavelength light source.

[(1) Single-Wavelength Light Source]

Figure 12:
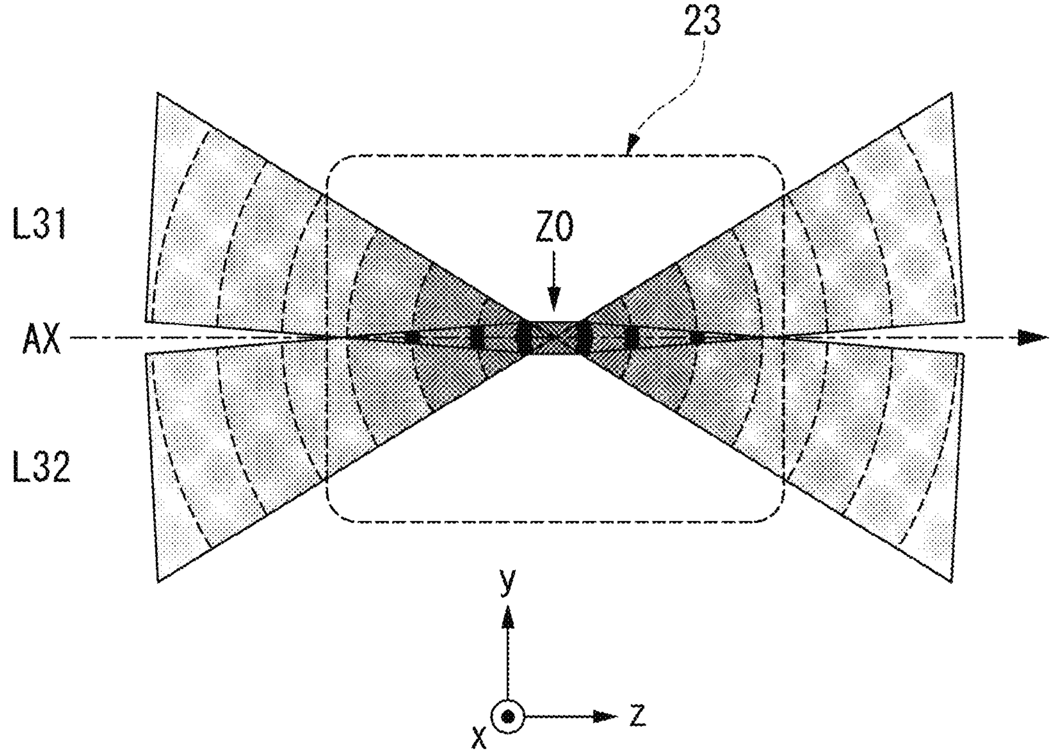
FIG. 12 A diagram illustrating an interference state of converged beams in the case of a single-wavelength light source.

FIG. 12 is a diagram illustrating an interference state of the converged beams L3 in the case of single-wavelength light source. The drawing schematically illustrates an interference state in the direction of the optical axis AX (the Z-axis direction) at the light condensing position 23 at which the converged beams L3 emitted from the stereoscopic display device 1 converge.

The first converged beam L31 and the second converged beam L32 emitted from the irradiation unit 20 converge at the light condensing position 23 and interfere with each other these two converged beams L3.

Through interference between the plurality of converged beams L3, an intensity distribution of excitation energy is generated in the direction of the optical axis AX at the light condensing position 23.

Figure 13:
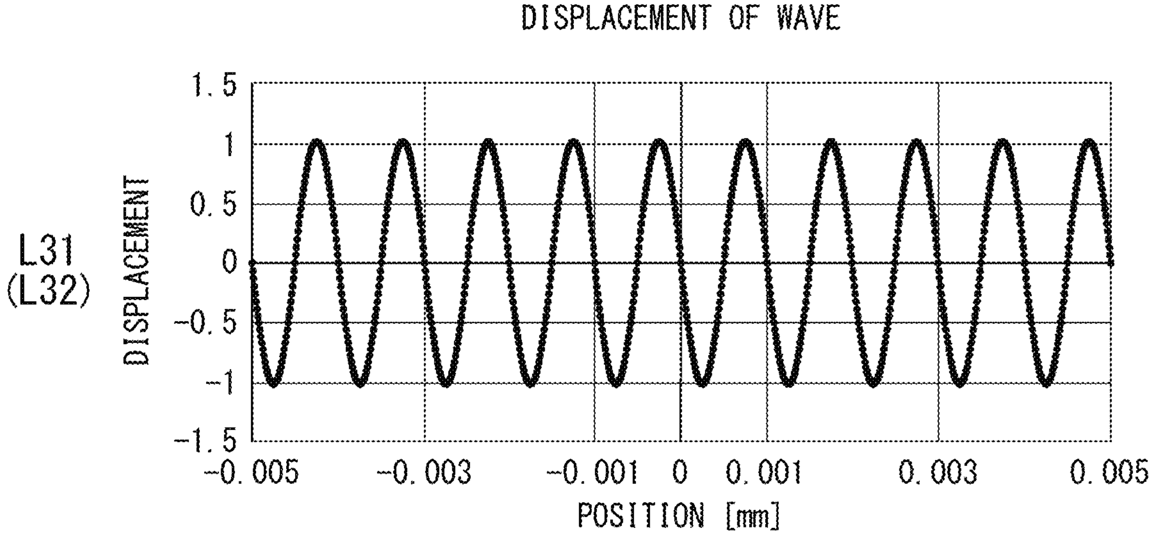
FIG. 13 A diagram illustrating an example of displacement characteristics of waves of a converged beam in the case of the single-wavelength light source.

FIG. 13 is a diagram illustrating an example of displacement characteristics of waves of the converged beams L3 in the case of single-wavelength light source. In the drawing, displacement of both the first converged beam L31 and the second converged beam L32 is expressed through normalization in ±1. In this example, both the first converged beam L31 and the second converged beam L32 have a wavelength of 1000 [nm] (0.001 [mm]) and have not phase difference.

Figure 14:
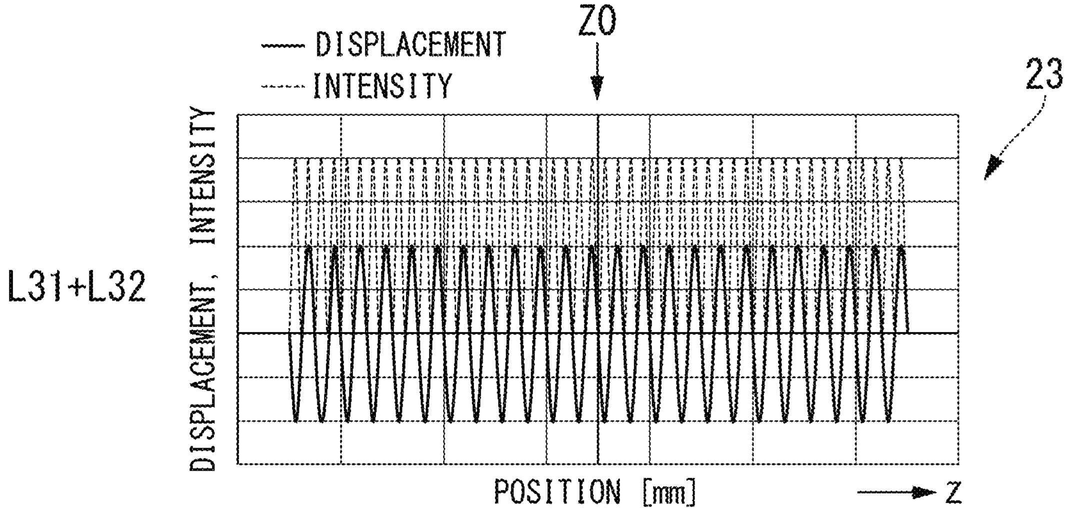
FIG. 14 A diagram illustrating an example of interference characteristics between converged beams in the case of the single-wavelength light source.

FIG. 14 is a diagram illustrating an example of interference characteristics of the converged beams L3 in the case of single-wavelength light source. When the first converged beam L31 and the second converged beam L32 illustrated in FIG. 12 interfere with each other at the light condensing position 23, the intensity of the laser beam L after interference is a square of a sum of the amplitude of the original converged beams L3 (that is, the first converged beam L31 and the second converged beam L32). A position Z0 in the drawing indicates the Z coordinate of the condensing pint.

For example, when displacement (amplitude) of both the first converged beam L31 and displacement of the second converged beam L32 is ±1, the maximum value of the intensities of the laser beam L after interference is 4. On the other hand, the maximum values of the intensities of the converged beams L3 before interference (the first converged beam L31 and the second converged beam L32) are 1. That is, the intensity of the laser beam L after interference is larger than the intensity of the laser beam L before interference. In this example, the intensity of the laser beam L after interference is four times the intensity of the laser beam L before interference.

Here, when the optical system of a laser beam L is disposed such that a plurality of laser beams L do not interfere with each other until reaching the light condensing position 23 and interfere with each other at the light condensing position 23 (particularly, the condensing point), the fluorescent material 21 is less likely to emit light until reaching the light condensing position 23 and can be caused to strongly emit light at the light condensing position 23. That is, when the optical system of a laser beam Lis disposed such that a plurality of laser beams L do not interfere with each other until reaching the light condensing position 23 and interfere with each other at the light condensing position 23 (particularly, the condensing point), it is possible to enhance the contrast of a stereoscopic image 22 in the drawing space 2 and to improve image quality of the stereoscopic image 22.

With the stereoscopic display device 1 according to the present embodiment, since the optical system of a laser beam Lis disposed such that a plurality of laser beams L do not interfere with each other until reaching the light condensing position 23 and interfere with each other at the light condensing position 23 (particularly, the condensing point), it is possible to improve image quality of the stereoscopic image 22.

Since the stereoscopic display device 1 according to the present embodiment includes the phase control unit 640, it is possible to change the interference state between a plurality of converged beams L3 at the light condensing position 23. With the stereoscopic display device 1 having this configuration, it is possible to change the level of excitation energy at the light condensing position 23 and to improve image quality of the stereoscopic image 22.

[(2) Two-Wavelength Light Source]

Figure 15:
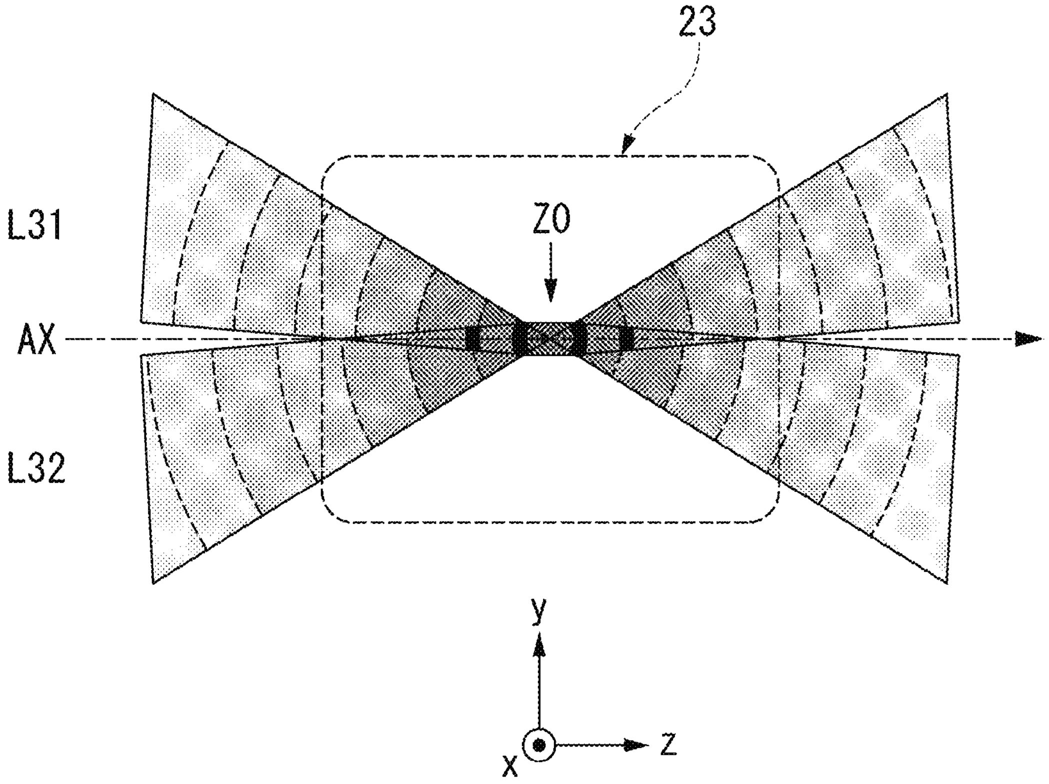
FIG. 15 A diagram illustrating an interference state of converged beams in the case of a two-wavelength light source.

FIG. 15 is a diagram illustrating an interference state of the converged beams L3 in the case of two-wavelength light source. The drawing schematically illustrates an interference state in the direction of the optical axis AX (the Z-axis direction) at the light condensing position 23 at which the converged beams L3 emitted from the stereoscopic display device 1 converge.

The first converged beam L31 and the second converged beam L32 emitted from the irradiation unit 20 converge at the light condensing position 23, and these two converged beams L3 interfere with each other.

Through interference between the plurality of converged beams L3, an intensity distribution of excitation energy is generated in the direction of the optical axis AX at the light condensing position 23.

Figure 16:
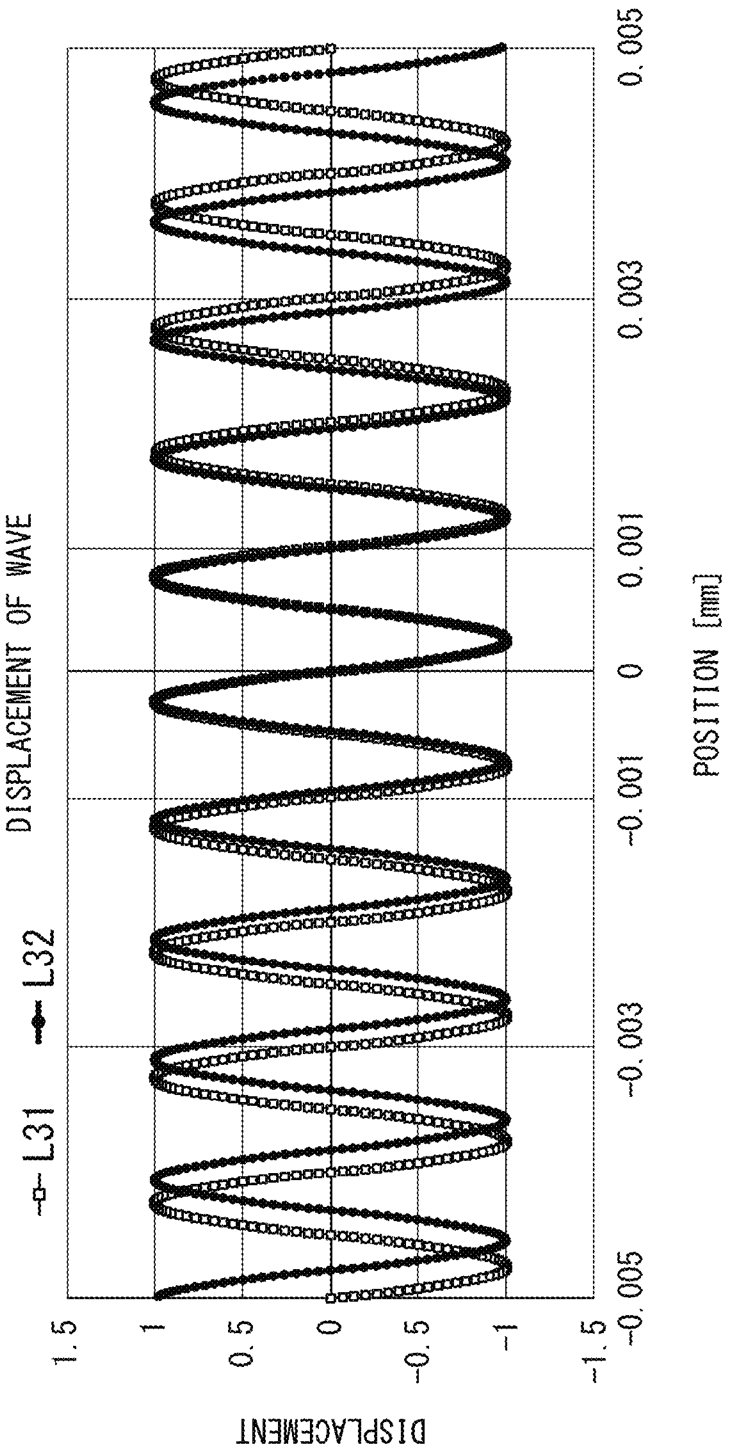
FIG. 16 A diagram illustrating an example of displacement characteristics of waves of a converged beam in the case of the two-wavelength light source.

FIG. 16 is a diagram illustrating an example of displacement characteristics of waves of the converged beams L3 in the case of two-wavelength light source. In the drawing, the displacement of both the first converged beam L31 and the second converged beam L32 is expressed through normalization in ±1.

In this example, the wavelength λ1 of the first source beam L11 emitted from the first laser light source 1101 is 1000 [nm] (0.001 [mm]). The wavelength 22 of the second source beam L12 emitted from the second laser light source 1102 is 960 [nm] (0.00096 [mm]). In this case, the first converged beam L31 and the second converged beam L32 almost match each other in displacement at the condensing point (position Z0) of the light condensing position 23 and deviate from each other in displacement as it goes apart in the horizontal axis direction (that is, the direction of the optical axis AX) of the graph in the drawing at the condensing point.

Figure 17:
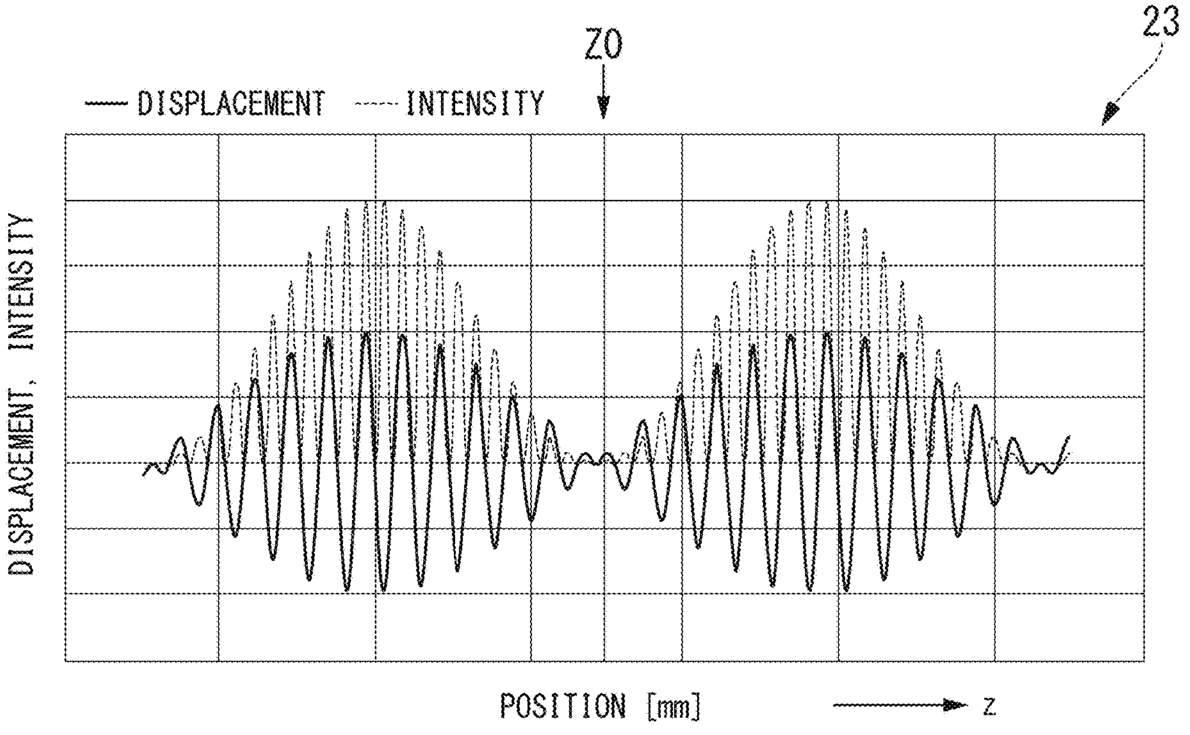
FIG. 17 A diagram illustrating an example of interference characteristics between converged beams in the case of the two-wavelength light source.

FIG. 17 is a diagram illustrating an example of interference characteristics of the converged beams L3 in the case of two-wavelength light source. When the first converged beam L31 and the second converged beam L32 illustrated in FIG. 15 interfere with each other at the light condensing position 23, the intensity of the laser beam L after interference is a square of a sum of the amplitude of the original converged beams L3.

As illustrated in the drawing, when a plurality of laser beams L emitted from two laser light sources 110 are slightly different in wavelength, an optical beat (a beat) is generated when the plurality of laser beams L interfere with each other. A frequency fb of the optical beat is a difference in frequency between the laser beams L. That is, when the frequency of the first source beam L11 is a frequency f1 and the frequency of the second source beam L12 is a frequency f2, the frequency fb of the optical beat is (|f1−f2|). The wavelength λb of the optical beat is represented by a reciprocal of the frequency at the light speed c. Under the aforementioned conditions of the wavelengths (λ1: 1000 [nm], λ2: 960 [nm]) of the two laser beams L, the wavelength λb of the optical beat is 0.024 [mm].

As illustrated in the drawing, when an optical beat is generated due to the two-wavelength light source, the maximum value of the intensities (that is, excitation energy) due to interference of two converged beams L3 becomes larger than that in the case of single-wavelength light source (for example, the case illustrated in FIG. 14). That is, in the case of two-wavelength light source, in comparison with the case of single-wavelength light source, it is possible to more concentrate excitation energy based on interference between a plurality of converged beams L3 on the condensing point. Accordingly, with the stereoscopic display device 1 employing the two-wavelength light source, it is possible to more improve the contrast of the stereoscopic image 22.

In any configuration of the case of single-wavelength light source and the case of two-wavelength light source, the stereoscopic display device 1 includes the modulator 220 and the phase control unit 640 and thus can control the interference state of the converged beams L3 at the light condensing position 23. Accordingly, for example, even when the phases of the plurality of converged beams L3 change due to some reasons, it is possible to perform control such that excitation energy based on interference between the converged beams L3 in the vicinity of the light condensing position 23 increases more by controlling the phases of the converged beams L3. With the stereoscopic display device 1 having this configuration, it is possible to stabilize the interference state of the converged beams L3 at the light condensing position 23 and to more improve the contrast of the stereoscopic image 22.

In any configuration of the case of single-wavelength light source and the case of two-wavelength light source, the stereoscopic display device 1 performs scanning with the split converged beams L3 using a single scan system (for example, the single converging lens 231 and the single scan mirror 241), and thus it is possible to decrease a mechanical error in interference position between the converged beams L3.

For example, when the wavelength λ1 of the first source beam L11 is 1000 [nm] and the wavelength 22 of the second source beam L12 is 998 [nm], the wavelength λb of the optical beat is 0.499 [mm]. In this state, when an overlap part of beams is set to 0.25 mm before and after the condensing point, it is possible to cause emission of light at only a position of one mountain of the optical beat and to prevent a drawn image from having double or triple lines when the image is drawn by scanning of a light condensing part. Accordingly, with the stereoscopic display device 1 having this configuration, it is possible to more improve the contrast of the stereoscopic image 22.

As described above, the stereoscopic display device 1 according to the present embodiment includes an optical system that can cause a plurality of converged beams L3 to be incident on the drawing space 2 and cause the plurality of converged beam L3 to interfere with each other at the light condensing position 23. Accordingly, with the stereoscopic display device 1 according to the present embodiment, it is possible to decrease the intensities of the converted beams L3 incident on the drawing space 2 such that emission of light from the fluorescent material 21 is sufficiently curbed and to apply excitation energy to the fluorescent material 21 such that the fluorescent material 21 sufficiently emits light at the light condensing position 23. As a result, with the stereoscopic display device 1 according to the present embodiment, it is possible to curb emission of light from the fluorescent material 21 in the middle way of the converged beams L3 from the incident position of the drawing space 2 to the light condensing position 23 and to improve the contrast of the stereoscopic image 22. That is, with the stereoscopic display device 1 according to the present embodiment, it is possible to improve the image quality of the stereoscopic image 22.

While embodiments of the present invention have been described above, the present invention is not limited to the embodiments, and various modifications can be added thereto without departing from the gist of the present invention. The embodiments may be appropriately combined.

REFERENCE SIGNS LIST

1 Stereoscopic display device
2 Drawing space
10 Light source unit
20 Irradiation unit
21 Fluorescent material
22 Stereoscopic image
23 Light condensing position

30 Storage unit
60 Control unit
110 Laser light source
120 Converter
130 Splitter
220 Modulator
230 Converger
240 Scanner
620 Intensity control unit

The invention claimed is:

1. A stereoscopic display device comprising:

a light source unit including a laser light source configured to emit a laser beam, a converter configured to convert a laser beam emitted from the laser light source to a collimated beam with a predetermined diameter, and a splitter configured to emit a plurality of collimated beams by reflecting the collimated beam which is incident from the converter using a plurality of mirrors having different reflection directions;

an irradiation unit including a converger configured to cause the plurality of collimated beams incident from the light source unit to converge to generate a plurality of converged beams and to cause the plurality of converged beams to interfere with each other at a light condensing position, and a scanner configured to three-dimensionally scan the light condensing position by using a drawing space including a fluorescent material which is excited to spontaneously emit light with irradiation with a laser beam as a scan target range, changing a focal distance at which the converged beams are caused to converge by the converger, and changing optical axis directions in which the plurality of converged beams are emitted together using a single optical axis direction changing element; and an intensity control unit configured to control an intensity at the light condensing position on the basis of drawing data indicating a light emission intensity at each position in the drawing space.

2. The stereoscopic display device according to claim 1, wherein the light source unit further includes a phase controller configured to control a phase of at least one of the plurality of collimated beams, and wherein the at least one collimated beam of which the phase has been controlled by the phase controller is emitted to the converger.

3. A stereoscopic display device comprising:

a light source unit including a plurality of laser light sources configured to each emit a laser beam, and a converter configured to convert a laser beam emitted from each laser light source to a collimated beam with a predetermined diameter, the light source unit emitting a plurality of collimated beams on which conversion has been performed by the converter;

an irradiation unit including a converger configured to cause the plurality of collimated beams incident from the light source unit to converge to generate a plurality of converged beams and to cause the plurality of converged beams to interfere with each other at a light condensing position, and a scanner configured to three-dimensionally scan the light condensing position by using a drawing space including a fluorescent material which is excited to spontaneously emit light with irradiation with a laser beam as a scan target range, changing a focal distance at which the converged beams are caused to converge by the converger, and changing optical axis directions in which the plurality of converged beams are emitted together using a single optical axis direction changing element; and an intensity control unit configured to control an intensity at the light condensing position on the basis of drawing data indicating a light emission intensity at each position in the drawing space.

4. A stereoscopic display device comprising:

a light source unit including a plurality of sets of a laser light source and a converter, the laser light source emitting a laser beam, the converter converting a laser beam emitted from the laser light source to a collimated beam with a predetermined diameter, the light source unit emitting a plurality of collimated beams;

an irradiation unit including a modulator configured to modulate a phase of at least one out of the plurality of collimated beams emitted from the light source unit, a converger configured to cause the plurality of collimated beams incident from the modulator to converge to generate a plurality of converged beams and to cause the plurality of converged beams to interfere with each other at a light condensing position, and a scanner configured to three-dimensionally scan the light condensing position by using a drawing space including a fluorescent material which is excited to spontaneously emit light with irradiation with a laser beam as a scan target range, changing a focal distance at which the converged beams are caused to converge by the converger, and changing optical axis directions in which the plurality of converged beams are emitted together using a single optical axis direction changing element;

an intensity control unit configured to control an intensity at the light condensing position on the basis of drawing data indicating a light emission intensity at each position in the drawing space; and a phase control unit configured to control phase modulation of a collimated beam performed by the modulator.

5. The stereoscopic display device according to claim 4, wherein the modulator sets the plurality of converged beams to have the same phase at the light condensing position.

6. The stereoscopic display device according to claim 4, wherein the plurality of laser light sources included in the light source unit are different in wavelength of a laser beam to be emitted.

* * * * *